(12) United States Patent
Burnett et al.

(10) Patent No.: US 11,713,885 B2
(45) Date of Patent: Aug. 1, 2023

(54) OVEN PROVIDING SURGE MODE CLEANING

(71) Applicant: Alto-Shaam, Inc., Menomonee Falls, WI (US)

(72) Inventors: Craig Douglas Burnett, Slinger, WI (US); Joshua J. Shimel, Waukesha, WI (US); Jon Paul Flick, Wales, WI (US); Jason David Schreiner, Menomonee Falls, WI (US); Andrew Podevels, Wauwatosa, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 301 days.

(21) Appl. No.: 17/205,723

(22) Filed: Mar. 18, 2021

(65) Prior Publication Data

US 2022/0299211 A1    Sep. 22, 2022

(51) Int. Cl.
*F24C 14/00* (2006.01)
*F24C 15/16* (2006.01)
*A21B 1/24* (2006.01)
*F24C 15/32* (2006.01)

(52) U.S. Cl.
CPC ............ *F24C 14/005* (2013.01); *F24C 15/16* (2013.01); *F24C 15/327* (2013.01)

(58) Field of Classification Search
CPC ........ A21B 1/245; F24C 14/005; F24C 15/16; F24C 15/327
See application file for complete search history.

(56) References Cited

U.S. PATENT DOCUMENTS

| | | | | |
|---|---|---|---|---|
| 1,778,141 | A * | 10/1930 | Birdsong | A47F 3/0495 |
| | | | | 62/247 |
| 3,373,754 | A * | 3/1968 | Squire | A47L 15/0097 |
| | | | | 134/115 R |
| 8,193,470 | B1 | 6/2012 | Harlamert et al. | |
| 2019/0056118 | A1* | 2/2019 | McKee | F24C 15/322 |
| 2019/0242587 | A1 | 8/2019 | McKee et al. | |

FOREIGN PATENT DOCUMENTS

| | | | | |
|---|---|---|---|---|
| DE | 102006025508 A1 * | 12/2006 | ............ | B08B 9/093 |
| EP | 3702676 | 9/2020 | | |
| KR | 10-2020-0101638 | 8/2020 | | |
| WO | WO-2010012357 A1 * | 2/2010 | ............ | D06F 39/02 |

\* cited by examiner

*Primary Examiner* — Jorge A Pereiro
*Assistant Examiner* — Logan P Jones
(74) *Attorney, Agent, or Firm* — Boyle Fredrickson S.C.

(57) ABSTRACT

A cleaning system for an oven having shelves which provide for distributed jets of heated air, allows water accumulation within the shelves during cleaning by reducing airflow through the shelf, and then provides rapid expulsion of the water in cohesive streams after accumulation to provide high inertial cleaning.

7 Claims, 9 Drawing Sheets

OVEN PROVIDING SURGE MODE CLEANING

CROSS REFERENCE TO RELATED APPLICATIONS

BACKGROUND OF THE INVENTION

The present invention relates to food preparation ovens and in particular to ovens having built-in water-cleaning systems.

Combination steam and convection ovens ("combi-ovens") cook using combinations of convection and steam. In convection cooking, heated air is circulated rapidly through the cooking compartment to break up insulating layers of air around the food, thereby increasing the rate of heat transfer. Steam enhances the rate of heat transfer to the food as a result of the high specific heat of water compared to dry air and can also reduce water loss from the food. Combi-ovens are described, for example, in U.S. Pat. Nos. 7,307,244 and 6,188,045 assigned to the assignee of the present invention and hereby incorporated by reference.

Combi-ovens may have provisions for cleaning by introducing water into the cooking cavity together with a detergent. This water and detergent may be heated and circulated by the oven fan and heater as a high velocity, atomized mist.

Professional kitchens are often called upon to simultaneously prepare a wide variety of dishes each one optimally being cooked for different periods of time, temperatures, and humidity. For this purpose, a multicavity oven has been developed having independent cooking chambers introducing heated air through openings in divider shelves between the chambers. An upper divider shelf may deliver heated air downwardly on the food while a lower divider shelf delivers deliver air upwardly. Air is distributed through the shelves by channels within the shelves communicating with a fan and heating system of the oven. Ovens of this kind are commercially available from Alto-Shaam, Inc. of Menomonee Falls, Wis., under the Vector trademark and subject to multiple pending patent applications including 2019/0056118; 2020/0041135; 2017/0211819; and U.S. application Ser. No. 17/078,711 filed Oct. 23, 2020, all hereby incorporated by reference.

SUMMARY OF THE INVENTION

The present inventors have recognized that the atomized water and steam produced in conventional oven cleaning systems may be inadequate for removing stubborn oven residue and clearing air channels in the divider shelves of multicavity ovens. The present invention accordingly introduces a surge cleaning system in which the oven fans are modulated to first allow an accumulation of water in the lower divider shelf and then to rapidly discharge this water in one or more substantially unbroken streams, the streams carrying debris from the shelves and providing a consolidated inertial impact against oven walls that can promote deep cleaning. Counter intuitively, the inventors have recognized that intermittent operation of the fans during cleaning can promote improved cleaning results.

Specifically, the present invention provides a multi-cavity oven having a housing holding a cooking volume surrounded by insulated outer walls and at least one door that may open and close to provide access to the cooking volume. A set of shelves divides the cooking volume into cooking cavities, the shelves having air channels each leading from an air inlet to upwardly or downwardly directed airstream openings into adjacent cavities. At least one fan provides air through the air channels into the air inlets, and a water inlet communicates with a water valve to introduce water into the cooking cavities. A controller controls the oven to provide a first and second cleaning state. In the first state, the fan operates below a predetermined airflow rate to allow water from the water inlet to drain backward into and accumulate in the air channels and in the second state, the fan operates above the predetermined airflow volume to rapidly expel accumulated water from the air channel through the airstream openings in at least one stream.

It is thus one feature of at least one embodiment of the invention to provide improved cleaning over atomized water and air by allowing water accumulation that can provide for high inertial impact against oven surfaces and that can help carry material and debris out of the air channels of the shelves.

The air may enter the rear of the shelf opposite the door so that momentum of the water moving through the air channels before discharge through the airstream openings directs at least one stream toward the door. The door may provide a glass panel.

It is thus a feature of at least one embodiment of the invention to provide improved cleaning of the door allowing better viewing of food during cooking and improved oven aesthetics after cleaning.

The shelves may include a set of airstream openings spaced along two different perpendicular dimensions of the shelves each providing a stream of water.

It is thus a feature of at least one embodiment of the invention to provide for multiple focused streams of water that may have higher velocity.

The oven may further include a set of drains leading from the cavities and wherein the valve controls the water inlet to provide a greater flow of water into the cavity than a flow of water out of the cavity through the drains to allow accumulation of water in the air channels.

It is thus a feature of at least one embodiment of the invention to provide a system that can allow for water accumulation while observing the necessity of draining water after the cleaning process.

The oven may include a heater operating to heat the water circulating in the cavity through action of the fan. It is thus a feature of at least one embodiment of the invention to provide both high inertial and heated water streams for improved cleaning.

In a second embodiment of the invention, the oven may include a steam generator for generating steam for introduction into the cooking volume. In this embodiment the controller may (a) open the water valve to allow water to flow in through the water inlet while operating the circulating fan to circulate water and a detergent material through the cooking volume; (b) allow a draining of detergent and water from the cooking volume; and (c) introduce steam into the cooking volume to dissipate accumulated detergent foam.

It is thus a feature of at least one embodiment of the invention to eliminate residual bits of detergent foam which can remain in the oven cavities, generated by the high degree of air turbulence and yet floating on rather than flowing with discharged water. The inventors have determined that high temperature steam can disrupt the structure of such foam without the need for additional rinse cycles.

The controller may further operate to include a step before step (a) of introducing steam into the cooking volume to soften accumulated grease.

It is thus a feature of at least one embodiment of the invention to make use of steam available in ovens of this kind both for initial and final cleaning steps.

The controller may further operate to provide a rinse cycle after step (b) in which additional water is introduced through the water inlet into the cooking volume and circulated by the fan and then allowed to drain from the cooking volume, and a rinse cycle after step (c) in which additional water is introduced through the water inlet into the cooking volume and circulated by the fan and then allowed to drain from the cooking volume.

It is thus a feature of at least one embodiment of the invention to collapse detergent foam so that it can be successfully rinsed out of the oven with a second rinse cycle thus allowing optimization of rinse water.

In yet another embodiment of the invention, the oven may provide an exhaust conduit associated with each chamber and having an exhaust conduit valve leading between each chamber and air outside of the housing. The controller communicates with the exhaust conduit valves to control the exhaust conduit valves during the cooking mode to independently control exhaust from each chamber according to separate cooking schedules and to control the exhaust conduit valves during a cleaning mode to open the exhaust conduit valves and water inlet valve to allow circulation of cleaning water by the fan through the cavities and at least a portion of the exhaust conduits.

It is thus a feature of at least one embodiment of the invention to provide improved cleaning of exhaust channels used for rapid air exchange in ovens of this kind. The inventors have determined that opening the valves reduces an effective dead space of air trapped in the exhaust channels that prevents proper cleaning.

The exhaust conduit valve may be displaced from a respective chamber by a portion of the exhaust conduit.

It is thus a feature of at least one embodiment of the invention to allow proper cleaning of an exhaust channel when the exhaust conduit valve is positioned away from the cooking chamber for protection against heat and direct contamination.

The portion of the exhaust conduit before the exhaust conduit valve may exit downwardly from the cooking cavity.

It is thus a feature of at least one embodiment of the invention to prevent minor amounts of contamination in the exhaust conduit from breaking off and falling into subsequent food in preparation.

Each exhaust conduit may provide a separate channel from a respective chamber to outside air.

It is thus a feature of at least one embodiment of the invention to prevent intercommunication between the cooking chambers through the exhaust conduits that could provide flavor transfer during different cooking cycles in different cavities where one cavity is in an overpressure state and one cavity is in a relative under pressure state.

The exhaust conduits may exit to outside air at openings separated from each other by a divider wall extending along a direction of airflow from the conduits from the openings and beyond the openings.

It is thus a feature of at least one embodiment of the invention to allow the exhaust conduits to exit at a common location, for example, removed from the oven user, without risking cross-contamination in the atmospheres of the chambers. The divider plate provides increased separation between the exhaust conduits while exposing them to the outside air for diffusion.

These particular objects and advantages may apply to only some embodiments falling within the claims and thus do not define the scope of the invention.

DETAILED DESCRIPTION OF THE PREFERRED EMBODIMENT

Figure 1:
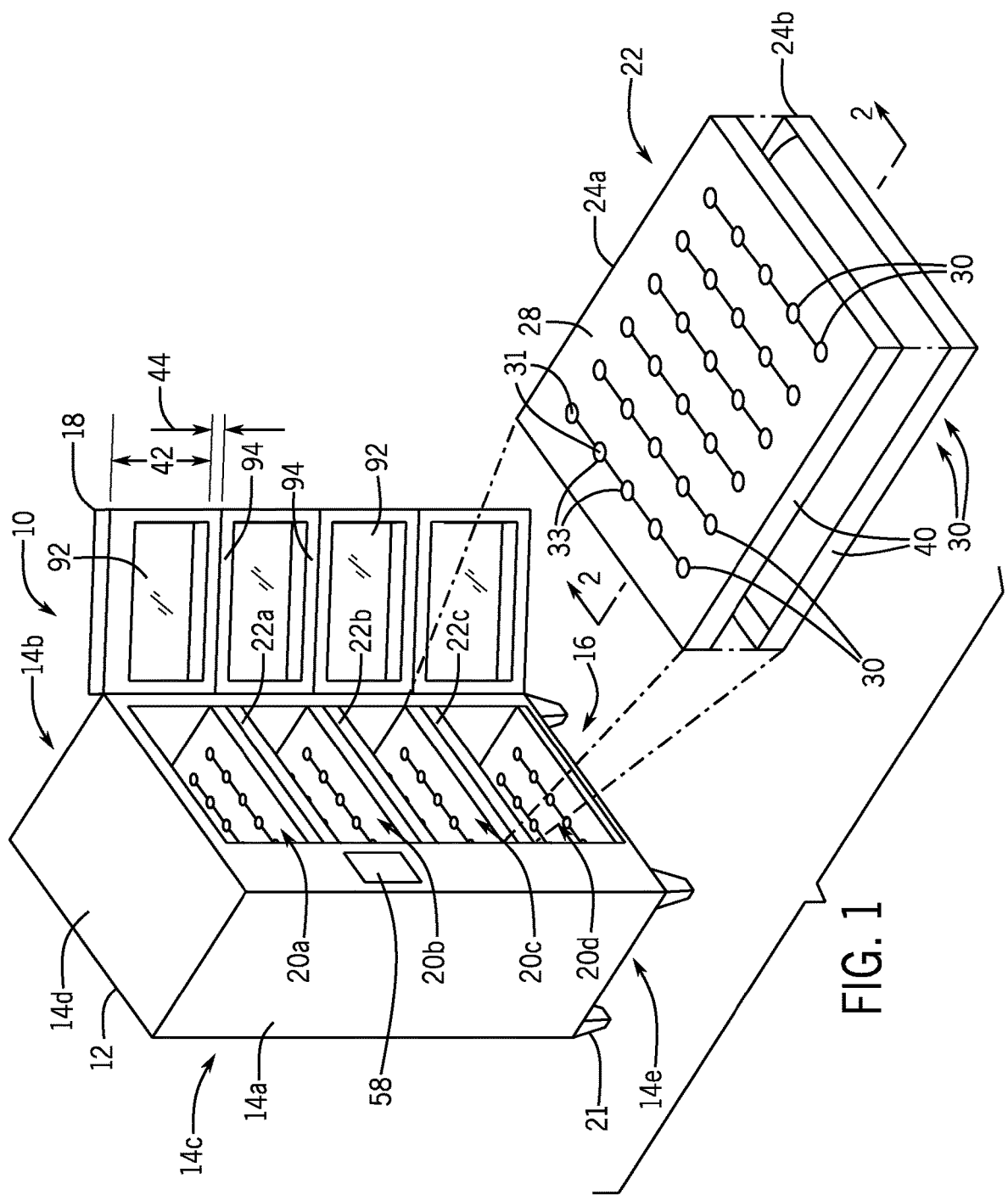
FIG. 1 is a perspective view of a four-cavity oven according to one embodiment of the present invention showing an expanded detail of a shelf made of separate upper and lower plenums individually removable through the open door of the oven.

Referring now to FIG. 1, a multi-zone, combi-oven 10 may provide for a housing 12 having upstanding insulated left and right outer sidewalls 14a and 14b and an upstanding outer insulated rear wall 14c extending between and joining opposed, generally horizontal insulated outer upper walls 14d and 14e. The walls 14 enclose a volume 16 opening toward the front and which may be covered by hinged door 18 when the door 18 is in a closed position as is generally understood in the art. The housing 12 may be supported on one or more legs 21 extending downwardly from a bottom surface of the bottom wall 14e.

The cooking volume 16 may be divided into multiple cooking cavities 20a-d. Although four cooking cavities are shown, the invention contemplates a range from 2 to 6 cooking cavities 20 in vertical, spaced separation. Each of the cooking cavities 20 is separated by a shelf 22a-c with shelf 22a separating cavities 20a and 20b, shelf 22b separating cavities 20b and 20c and shelf 22c separating cavities 20c and 20d.

Figure 2:
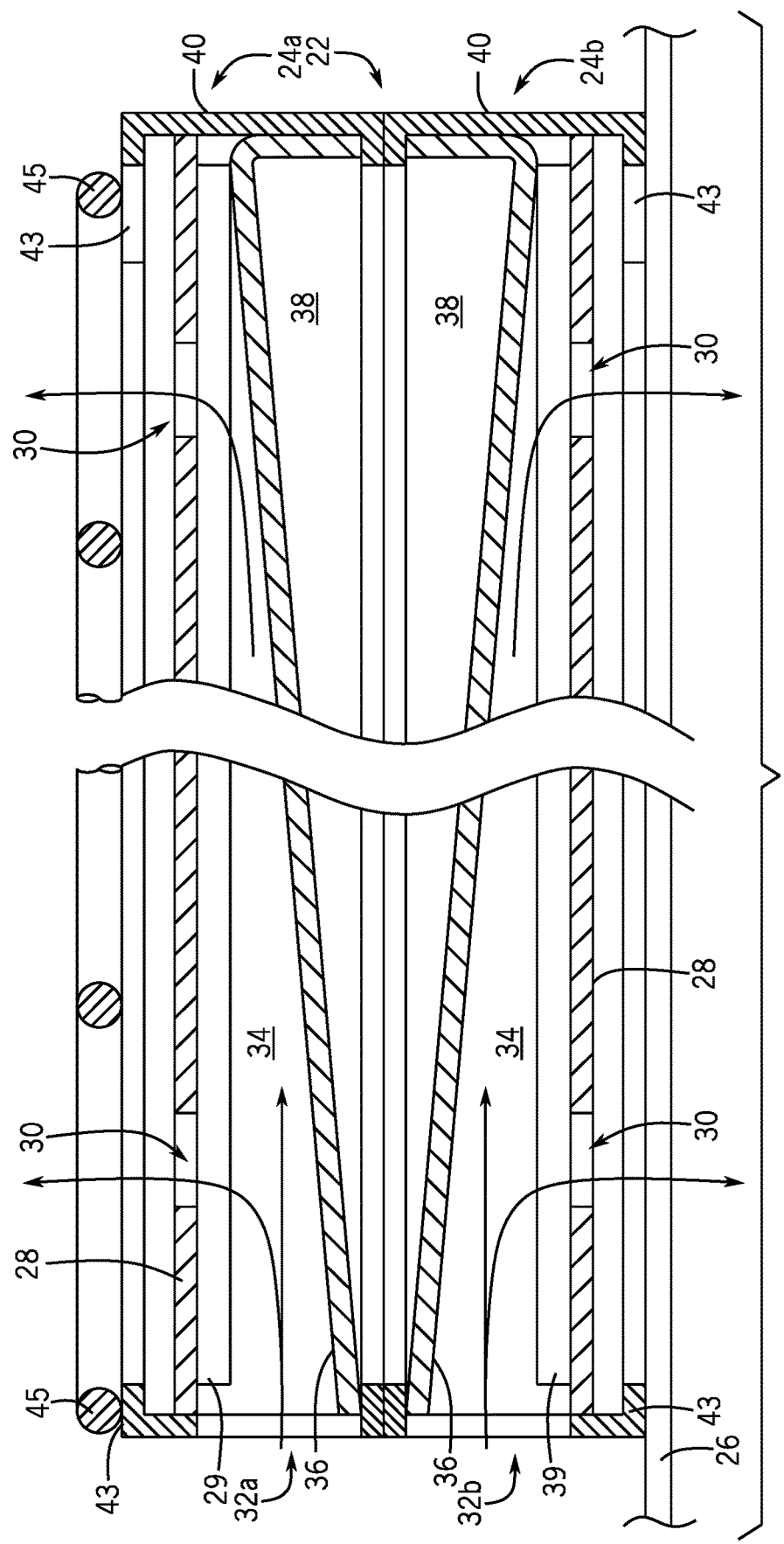
FIG. 2 is a cross-sectional view taken along line 2-2 of FIG. 1 showing the segregated internal air channels in the shelf such as may conduct different temperatures of air while maintaining thermal separation between the cavities by active insulation and other techniques.

Referring also to FIG. 2, each shelf 22 may be made up of a separate upper and lower generally rectangular plenum 24a and 24b fitting horizontally in the cooking volume 16 with plenum 24a facing an upper cavity 20 and plenum 24b facing a lower cavity 20. A single upper plenum 24a forms the bottom of the lowermost cavity 20d and a single lower plenum 24b forms the upper wall of the uppermost cavity 20a.

An outer surface of each plenum 24 provides a horizontally extending air distribution plate 28 having a set of airstream openings 30 distributed over its area to provide for substantially even airflow therethrough. In one embodiment, the airstream openings 30 in the air distribution plate 28 may provide a series of holes 31 joined by slots 33 extending in multiple rows from the left to the right side of the cavities 20 as described in U.S. patent application Ser. No. 15/224,319 referenced above. Generally, a width of the slots 33 will be less than 0.05 inches and preferably less than 0.1 inches to reduce pressure loss in the channel 34 that could result from high slot area. The holes 31 are much larger than the slot 33 and maybe circular and may have a diameter ranging from 0.3 inches to 0.6 inches to provide airstreams that help shepherd the air from the slots 33 while also minimizing loss of air pressure. Slot lengths may vary between 1 to 2 inches and are preferably approximately 1.6 inches. The air distribution plate 28 is a thin sheet of metal, for example, stainless steel, with a thickness less than ⅛ inch and typically less than ¹⁄₁₆ inch, such as may be easily formed using laser cutting techniques.

Air enters through sidewalls of each of the plenums 24a and 24b at air inlets 32a and 32b, respectively, from corresponding outlets at the rear of each cavity. These air inlets 32 may be as little as 1½ inches tall and preferably less than one inch tall. From the air inlets 32a and 32b, the air then passes through a horizontally extending channel 34 defined by an inner surface of the air distribution plates 28 and inner surface of a focusing wall 36 opposite the air distribution plate 28 about the channel 34. The focusing wall 36 has a maximum separation from the air distribution plate 28 at the air inlet 32 and then curves inward toward the air distribution plate 28 as air conducted in the channel 34 escapes through the airstream openings 30 and less channel height is needed. This inward sloping of the focusing walls 36 for each of the plenums 24a and 24b together provides an additional insulation zone 38 between the barrier walls 36 of the upper and lower plenums 24a and 24b, respectively, minimizing shelf height but maximizing insulation value. The average separation of the barrier walls 36 may be approximately one inch varying from contact between the barrier walls to nearly 2 inches in separation. The invention contemplates an average separation of at least one-quarter inch and preferably at least one inch.

A peripheral wall 40 of each plenum 24 surrounds the air distribution plate 28 and the barrier wall 36 to corral air within the channel 34 in all directions except through the inlets 32 and the airstream openings 30. Peripheral wall 40 also provides inwardly horizontally extending tabs 43 which may support a wire rack 45 at a separation of approximately ¼ inch and at least ⅛ inch above the upper extent of the air distribution plate 28 of the upper plenum 24a. In one embodiment the wire rack 45 may be supported by more than one inch above the air distribution plate 28 and desirably more than 1.5 inches above the air distribution plate either through the use of a special wire rack 45 or extender tabs 43 (not shown). In this way, a cooking sheet or pan set on top of the shelf 22 rests on the wire rack 45 and does not block the airstream openings 30. In a preferred embodiment, a separation 44 (shown in FIGS. 1 and 4) between the uppermost extent of the airstream openings 30 of the air distribution plate 28 of the upper plenum 24a and the lowermost extent of the airstream openings 30 of the air distribution plate 28 of the lower plenum 24b will be less than four inches, preferably less than three inches and desirably less than two inches providing an extremely compact shelf maximizing cavity space and minimizing total height. The cavities 20 (shown in FIGS. 1 and 4) will have a nominal height 42 between four and nine inches and preferably five inches or more defined by the distance between air distribution plates 28 bounding the upper and lower extent of the cavity 20. In one nonlimiting example, each cavity may add a height of about seven inches to the oven so that three cavities may have a height of no more than 23 inches or at least no more than 25 inches, and four cavities may have a nominal height of 30 inches and no more than 35 inches.

Generally the shelves 22 may be constructed entirely of stainless steel for durability and ease of cleaning, and although the invention contemplates that thin insulating materials may also be incorporated into the shelves 22 in some embodiments, the invention contemplates that no nonmetallic shelf construction materials are required. The barrier walls 36 may be held within each plenum 24 with a "floating mounting" allowing sliding of the barrier walls 36 with respect to the other structures of the plenums 24, for example, by creating a sliding fit between these components augmented by a natural flexure of the metal of the barrier walls 36 providing a light pressure between the barrier walls 36 and the ribs 29 and inwardly extending lips of the peripheral walls 40.

Figure 3:
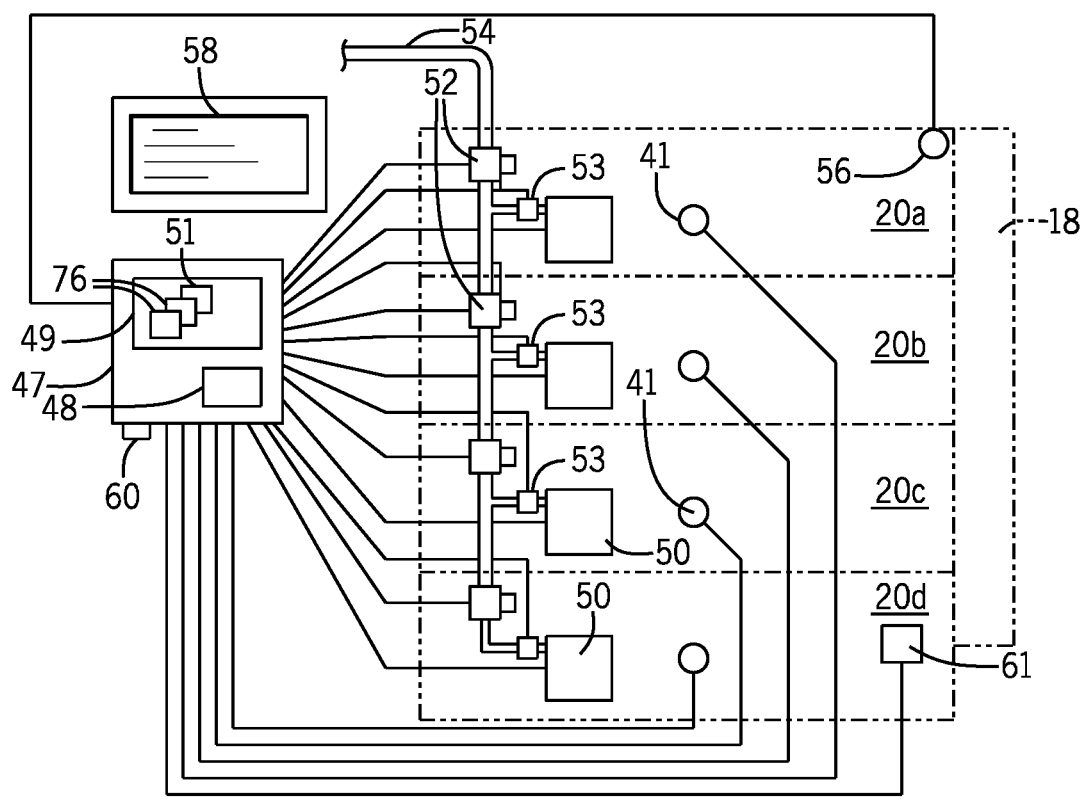
FIG. 3 is a simplified block diagram of the air delivery system and water control valves used for steam generation and cleaning feedback control.

Referring now to FIG. 3 each of the cavities 20 may be associated with a temperature sensor 41 communicating with a controller 47, for example, being a microcontroller having one or more processor 48 executing programs and communicating with an associated memory 49, holding an operating program 51 and various recipe schedules 76. The temperature sensors 41 may be thermistors, resistive temperature sensors, or the like.

Each cavity 20 may also be associated with an airflow system 50 comprising a heater system, fan motor, and variable speed motor controller so that the controller 47 may independently control the airflow circulating through each cavity 20 through a continuous range and may control the temperature of that air through a continuous range of temperatures. The heater system may be, for example, an electric resistance heater such as a "cal" rod controlled by a solid-state relay or may be a heat exchanger of an electrically controllable gas burner system.

Optionally, each cavity 20 may have an electrically controllable wash water valve 52 communicating with a common water supply 54 so that water for cleaning may be introduced into the cavity by a signal to the controllable wash water valve 52 from the controller 47. Additional steam control valve 53 may be operated to allow water to be introduced to the heating units of the airflow system 50 as will be discussed below to allow independent control of moisture according to a cooking schedule. Mechanisms for the introduction of controlled moisture into an oven cavity 20 suitable for the present invention are described, for example, in U.S. Pat. Nos. 9,375,021; 7,307,244; 7,282,674; and 6,188,045 assigned to the assignee of the present application and hereby incorporated by reference.

The controller 47 may also receive a signal from a door switch 56 (such as a limit switch or proximity switch) and may provide for input and output to an oven user through a user interface 58 such as a touch screen, graphic display, membrane switch or the like such as are well known in the art. A data connector 60 may communicate with the controller 47 to allow for the readily uploading of cooking schedules 76 over the Internet or by transfer from a portable storage device or the like.

One or more of the cavities 20 may also include a smoker 61, for example, providing a compartment that may hold woodchips or the like to be heated by an electric element controlled by the controller 47 through corresponding solid-state relays. The construction of a smoker 61 suitable for the present invention is described, for example, in U.S. Pat. Nos. 7,755,005; 7,317,173; and 7,157,668 each assigned to the assignee of the present invention and hereby incorporated by reference.

Figure 4:
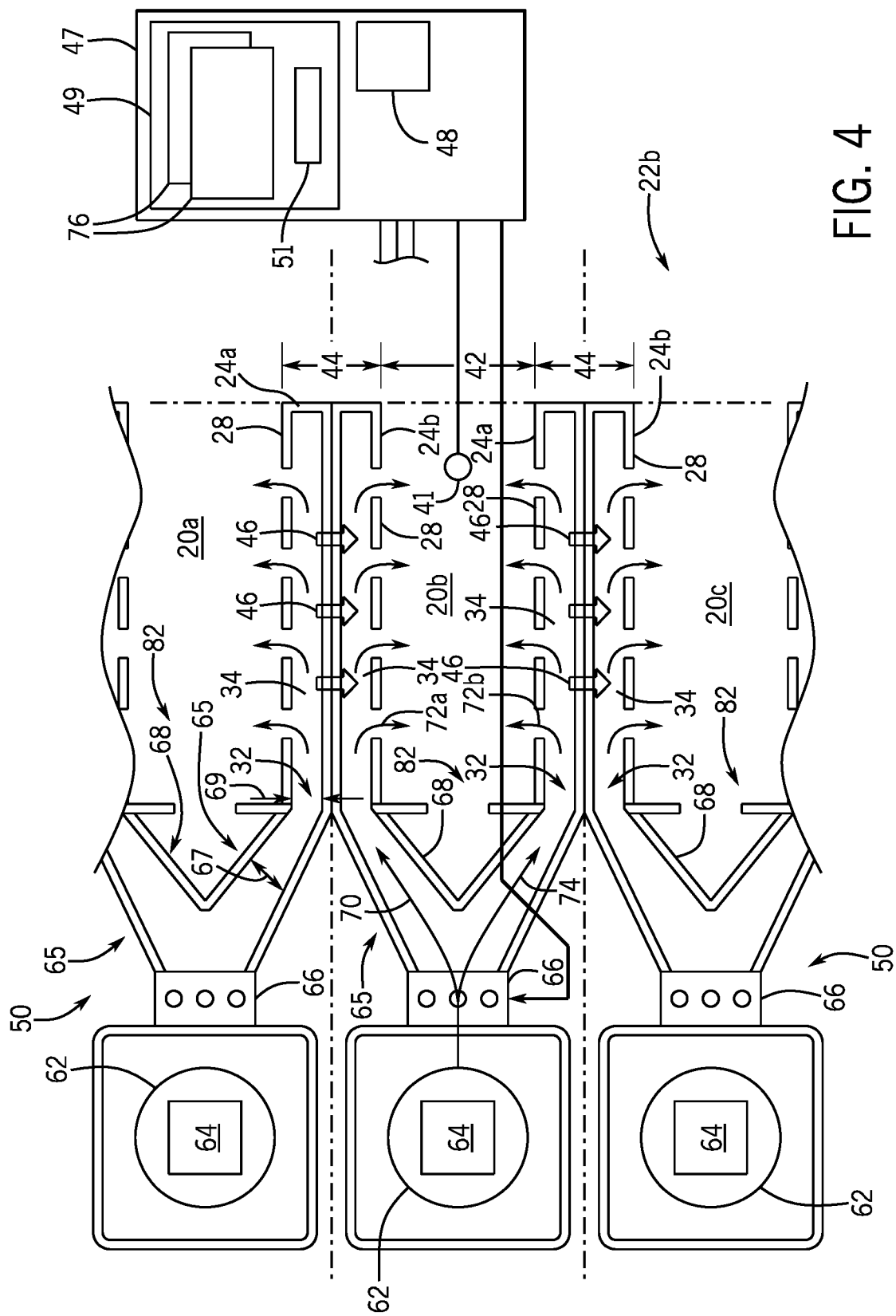
FIG. 4 is a fragmentary elevational schematic cross-section through multiple cavities of FIG. 1 showing the airflow from a fan and heater system into the cavities via the shelves dividing the cavities.

Referring now to FIG. 4, the airflow system 50 of each cavity 20 (indicated generally by separating dotted lines) may include a separate fan 62 independently controlled by a variable speed motor and motor drive 64. The fan 62 may be, for example, a squirrel cage fan and the motor a DC synchronous motor driven by a solid-state motor controller of a type known in the art. The use of separate fans 62 permits full segregation of the airflows within each cavity 20. The use of a separate motor and motor drive 64 allows independent airspeed control of the air in each cavity 20.

The airflow system 50 may also include a heater 66 and the air from each fan 62 may pass through a heater 66 to be received by a bifurcated manifold 68 which separates the heated airstream into an upper airstream 70 and lower airstream 74. The upper airstream 70 passes into the channel 34 (shown in FIG. 2) of a lower plenum 24b of an upper shelf 22 defining an upper wall of the cavity 20 and then exits from the channel 34 as a set of downwardly directed airstreams 72a from each of the airstream openings 30 (shown in FIG. 2) distributed over the lower area of the plenum 24b. The lower airstream 74 passes into the upper channel 34 of upper plenum 24a of a lower shelf 22 defining a lower wall of the cavity 20 to exit from the channel 34 as a set of upwardly directed airstreams 72b from each of the airstream openings 30 (shown in FIG. 2) distributed over the upper area of the plenum 24a.

The bifurcated manifold 68 may be designed to provide substantially greater airflow in the upper airstream 70 than the airflow of the lower airstream 74, for example, by constrictions or orientation of the branches of the bifurcated manifold 68 with respect to the natural cyclic flow of the fan. In one example, the air may be split so that 53 to 60 percent of the heated air is allocated to the lower shelf sending air upward, and 40 to 57 percent of the heated air is allocated to the upper plenum pulling downward as described in U.S. patent application Ser. No. 15/016,093 cited above.

This arrangement of fans, airflow system 50 and bifurcated manifold 68 is duplicated for each cavity 20. In the uppermost cavity 20a only a single lower plenum 24b is provided at the top of that cavity 20a and in the lowermost cavity 20d only a single upper plenum 24a is provided, each being effectively one half of shelf 22.

Figure 5:
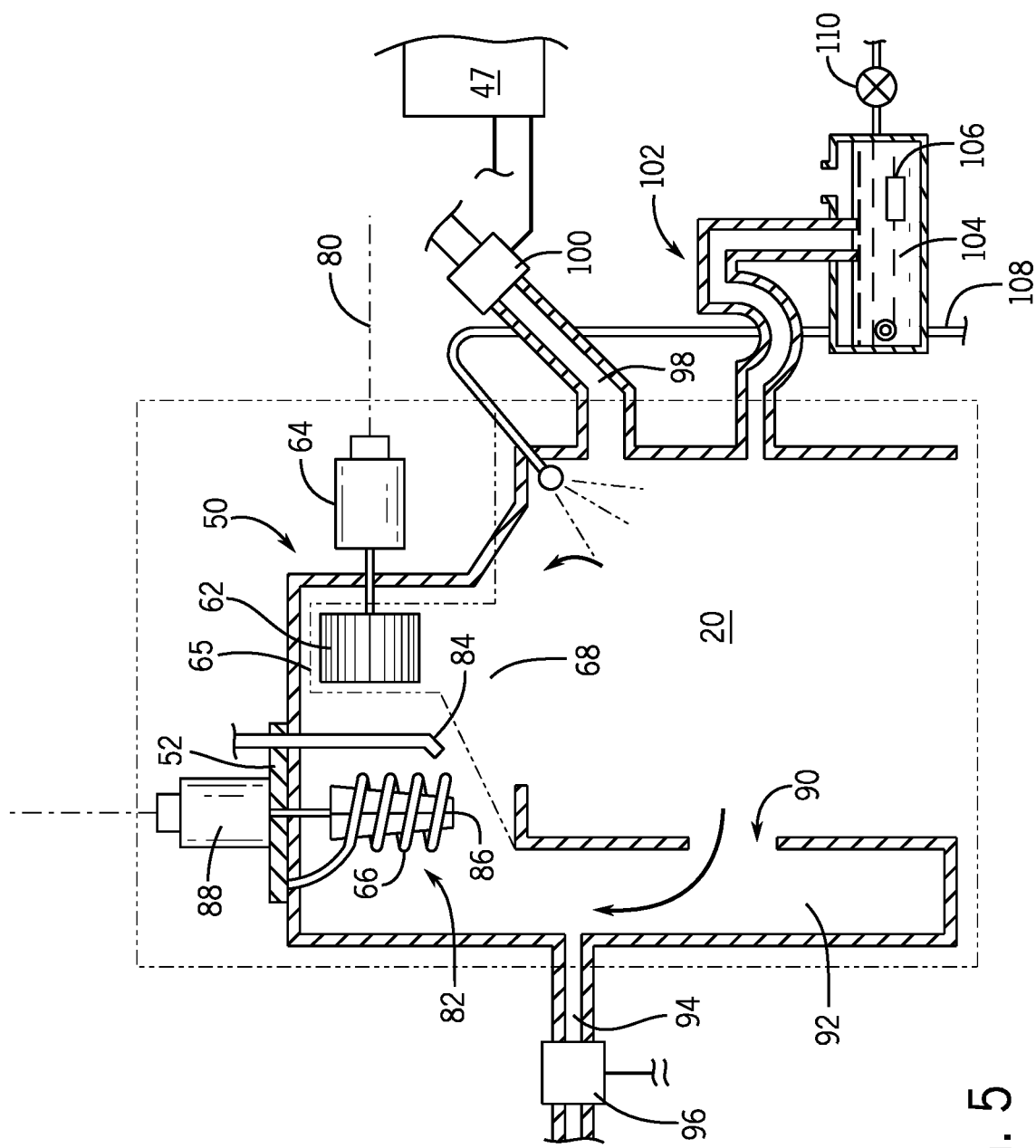
FIG. 5 is an planar schematic cross-section through one cavity of the oven of FIG. 1 showing the fan and steam-generating system together with valving and a drain system for managing cleaning water and air intake and exhaust conduits leading to outside air.

Referring now to FIG. 5, in one embodiment, the fan 62 may be a centrifugal fan having a squirrel cage impeller mounted for rotation about a horizontal axis 80 extending from the right to left wall of the oven 10 with the fan 62 centered with respect to the volume of the cavity 20. A steam generator 82, also positioned rearward from each cavity 20 and leftward from the fan 62 (for example), provides a water injector 84 providing a conduit and nozzle directing a stream of water or water droplets onto a rotating spinner 86. The spinner 86 may be mounted for rotation, independent of rotation fan 62, driven by a speed-controlled motor 88, or may make use of motor 64 with appropriate linkage.

The water injector 84 may disperse freshwater onto the rotating spinner 86 to break up the water and emit a fine spray of water that is heated by a helical heater tube of heater 66 surrounding the spinner 86. Water to the water injector 84 may be controlled by an electronically controlled wash water valve 52. In this way, the convection fan speed-controlled motor 64 and the spinner speed-controlled motor 88 are independently controlled to provide separate control of a heating of the oven cavity 20 and steam generation of the oven cavity 20.

Referring still to FIG. 5, air from the fan 62 as heated by the heater 66 may enter into the cavity 20 to heat contained food and then be drawn through a side vent 90 into a return duct 92 to again pass by the heater 66. The size of the side vent 90 is such as to provide a slight constriction producing a low pressure in the return duct which may communicate with a fresh air conduit 94, either directly or optionally controlled by valve 96, providing air inlet from outside of the oven. Valve 96 may be controlled by the controller 47.

Likewise, the cavity 20 will be at slightly higher pressure because of the size of the side vent 90 and may communicate with an exhaust conduit 98 controlled by valve 100 through controller 47 providing an exhaust of air and steam from the cavity 20 to the outside air as will be discussed below.

As noted above, wash water can be introduced into the cavity 20, for example, through a spray nozzle in the cavity 20 or in the bifurcated manifold 68 or both. A system of drains 102 allows excess water to be drained into a holding reservoir 104 into which a detergent material 106 may be placed for cleaning. This reservoir 104 may provide water through a pump (not shown) to the wash water valve 52 for recycling cleaning water and may provide for a drain 108 and freshwater make up valve 110 leading to a freshwater supply as is generally understood in the art.

Figure 8:
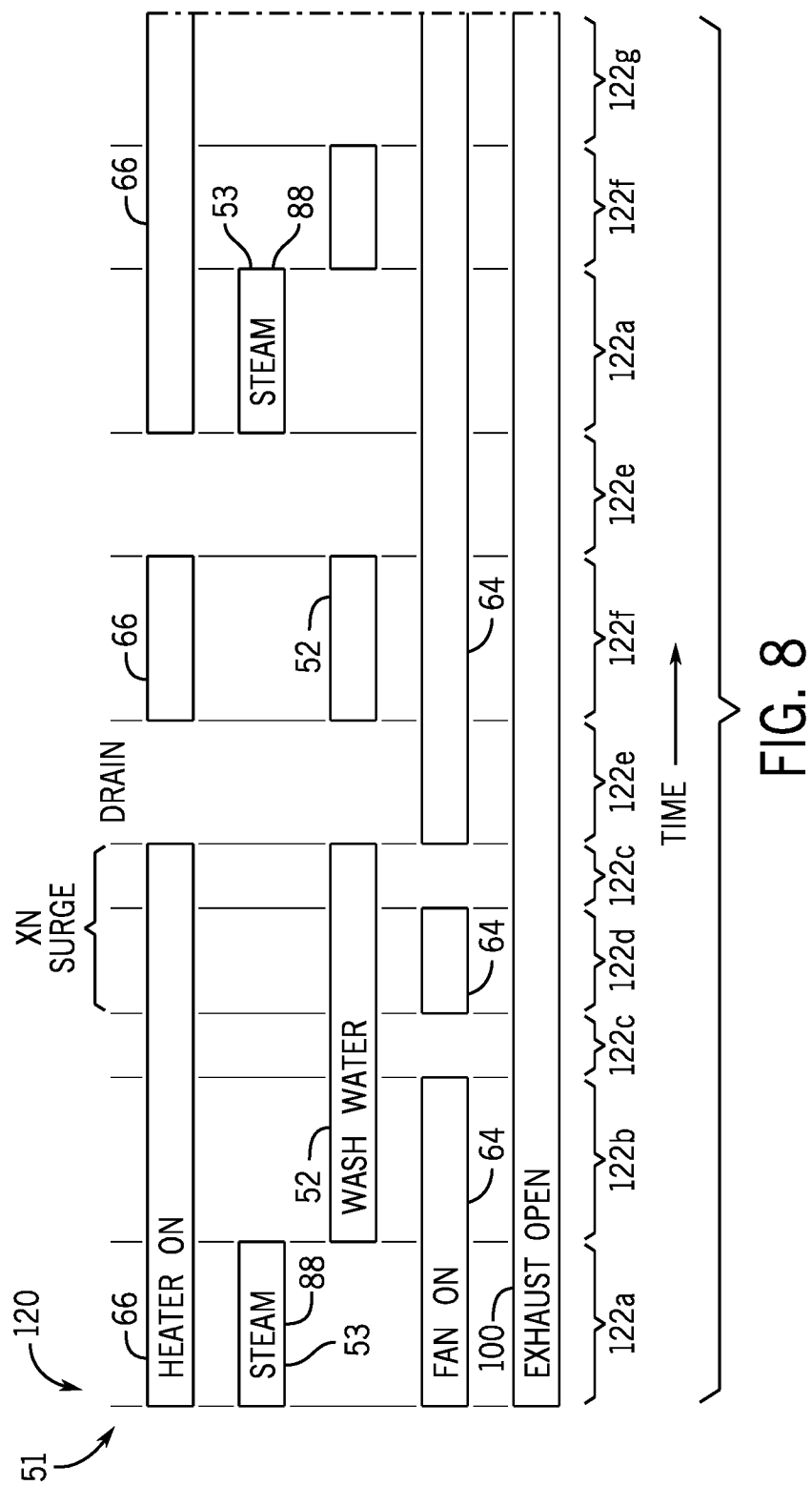
FIG. 8 is a timing diagram of a program executed by the controller to provide the surge cleaning of FIGS. 6 and 7 and providing a foam reduction treatment collapsing residual detergent foam.

Referring now to FIG. 8, the program 51 of the controller 47 (shown in FIG. 4) implements a cleaning sequence beginning at a stage 120, for example, as initiated by the user entering information through interface 58 (shown in FIG. 8). At this time program 51 may communicate to the user that detergent material should be added to the reservoir 104 or placed within each of the cavities 20 by means of display of the interface 58 shown in FIG. 3.

Once detergent has been added and the door is closed, as indicated by door switch 56 (shown in FIG. 3), the heater 66 may be activated and steam water valve 53 opened to begin the production of steam generation as indicated during stage 122a. At this time, the wash water valves 52 are closed and the exhaust conduit valves 100 (shown in FIG. 5) are opened to encourage cleaning steam to enter and soften material in the conduits 98. The fan motor 64 is operated to assist in steam dispersion.

At the next stage 122b, wash water valves 52 are opened and steam water valve 53 closed while maintaining activation of the heater 66 so that heated water is introduced into each cavity 20 and circulated by the high-speed air from the fan 62. This process produces a spray of detergent-infused, heated and atomized water coating all cleanable surfaces of the oven interior.

Figure 6:
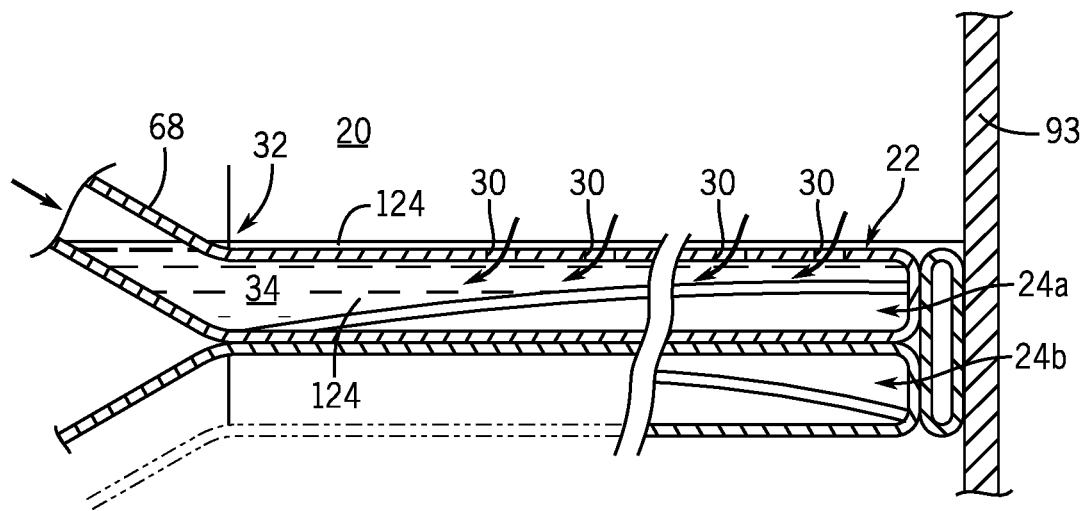
FIG. 6 is a fragmentary cross-sectional view similar to that of FIG. 2 showing an accumulation stage of a cleaning cycle where a charge of water is allowed to collect in a lower divider shelf.

Referring now also to FIG. 6, at the next stage 122c, surge cleaning begins and the fan 62 is turned off or lowered in speed so that water 124 introduced through wash water valves 52 and heated by heater 66 drains backwards into the upper plenums 24 through jet openings 30 to substantially fill the air channel 34. In this regard the drains 102 may be sized or valved to allow sufficient water accumulation so that at least 25% of the air channel 34 is filled and preferably there is a small amount of standing water over the openings 30.

Figure 7:
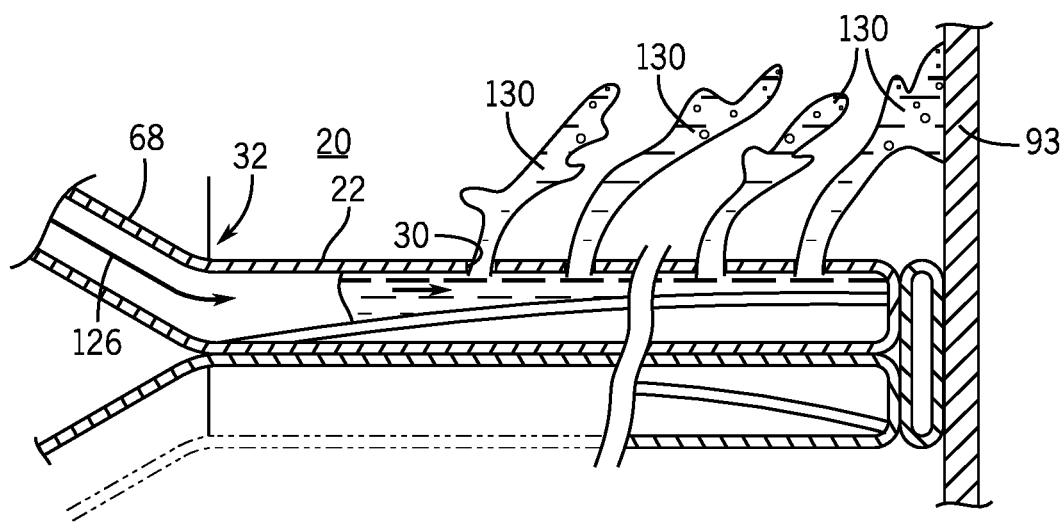
FIG. 7 is a figure similar to that of FIG. 6 showing a rapid discharge of the collected water in a second surge stage of the cleaning cycle in a set of non-atomized sheets.

At the next stage 122, the fan 62 may be turned on again quickly to high speed producing a sudden pressurized flow 126 of air into the channels 34 as shown in FIG. 7. This ejects multiple continuous streams or slugs 130 of water and/or suds from the openings 30 which, in contrast to the atomized heated water, provide a scouring flow emptying channels 34 of debris and a contiguous mass of water providing high inertial impact to the surfaces of the oven. In this tsunami type flow, softened grease and the like may be removed. The momentum of the water within the air channel 34 prior to exiting encourages the cohesive streams of water 130 toward the glass 93 on the inner surface of the of the door 18 providing improved cleaning of this highly visible surface. In one embodiment, the streams of water 103 will have a contiguous extent from the openings 30 upward by one or more inches without substantial dispersion.

The steps of stages 122c and 122d may have a duration of approximately one minute and may be repeated multiple times, alternating between the accumulation of FIG. 6 and stage 122c and the rapid expulsion of slugs of water in a surge as shown in FIG. 7 per stage 122d.

At a next stage 122e, the wash water valve 52 and heater 66 are turned off and water is allowed to drain. The fan 62 is activated to help in this process.

After a suitable draining time, at stage 122f, a rinse is performed in which the wash water valve 52 is again activated optionally with the heater 66 and the fan 62 followed by second drain stage 122e.

At the conclusion of this draining, there may be bits of detergent foam remaining in the cavity 20 representing an extremely small amount of persistent material. At a successive foam elimination stage 122, steam is again activated by turning on steam water valves 53, heater 66, and motor 88 without wash water through wash water valve 52 but with the fan 62 on to disperse the steam. The hot steam quickly expands the contained air pockets in any detergent foam structure breaking down the foam. This steam reduction step of stage 122a may be followed by an optional additional rinsing stage 122f and then a drying stage 122g where the fan 62 and heater 66 are activated without water or steam.

Figure 9:
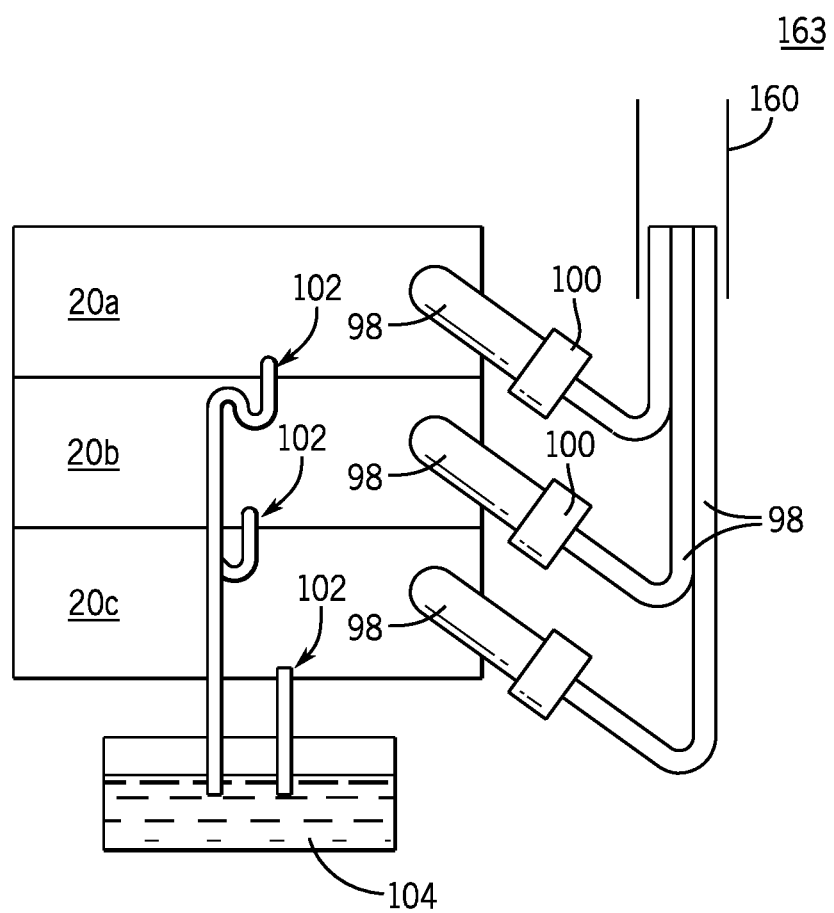
FIG. 9 is a side elevational view of the oven of FIG. 1 showing an arrangement of exhaust conduits and valving to improve cleaning of the conduits and to prevent inter-cavity transfer of odors.

Referring now to FIG. 9, during the cleaning process, the valves 100 of the exhaust conduits 98 may be opened as noted to encourage steam and cleaning solution into the proximate portions of the exhaust conduits 98 to clean cooking grease and the like from these portions which may have entered during exhaust cycles to be cooled by these conduit walls and condensed thereon. In one embodiment, the proximate portions of the exhaust conduits 98 may be angled downward from their connection to the cavities 20 so that any material not cleaned from the exhaust conduits 98 does not subsequently fall into the cavity 20, for example, during subsequent heating when the material may possibly crack or flake off. After exiting at a downward angle, the exhaust conduits 98 may angle upward and be collected together through a chimney 160 to exit to the outside air 163. The upward bend of the exhaust conduits 98 may include water drains or the like passing to reservoir 104 if necessary.

Figure 11:
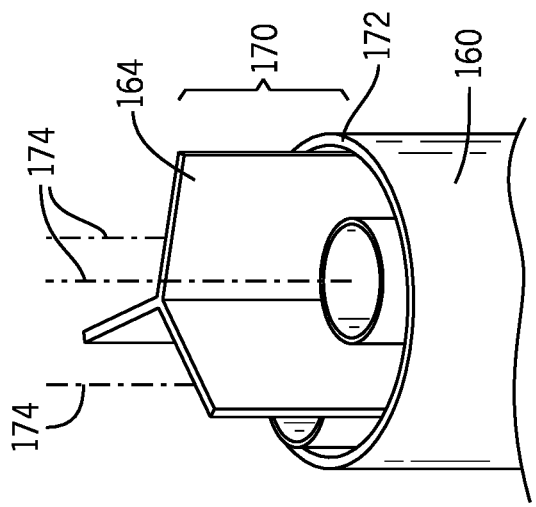
FIG. 11 is a figure similar to FIG. 10 in assembled form.
Figure 10:
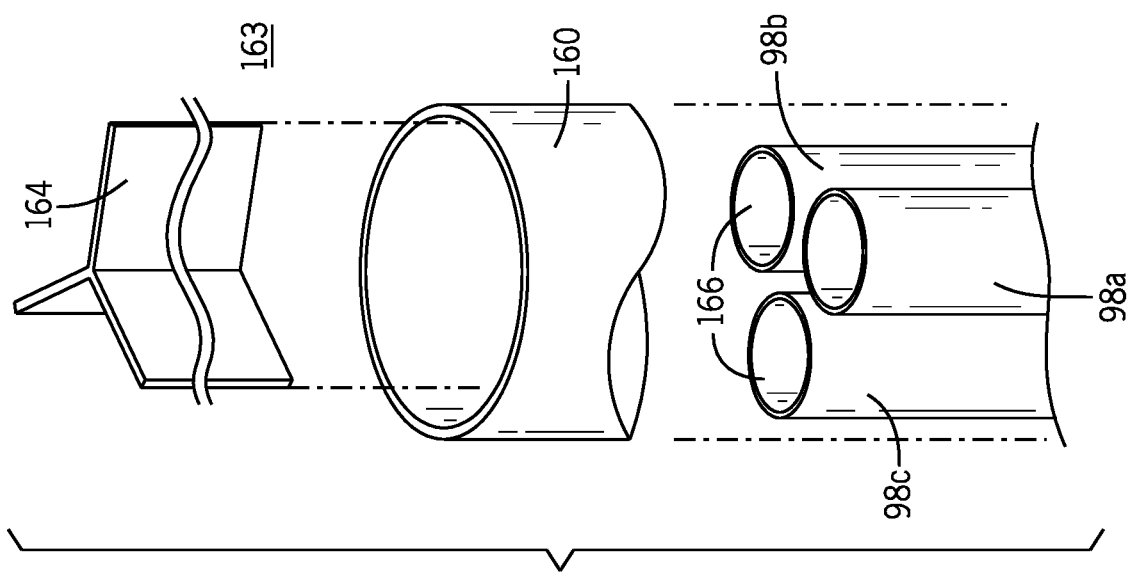
FIG. 10 is an exploded perspective fragmentary view of a chimney holding the exhaust conduits of FIG. 9 in separation for communication with outside air.

Referring now to FIGS. 10 and 11, as noted multiple exhaust conduits 98a-98c may be collected together within a tubular chimney 160 to be conducted to the outside air 162. By collecting the exhaust conduits 98 in this manner, heated steam or the like exhausted from the cavities 20 may be safely directed away from users of the oven 10 to a single location. However it is important that there not be a possible cross-contamination path out of one exhaust conduit 98, for example, from a cavity 20 cooking with steam at overpressure, to a second cavity 20 that, for example, might be cooling. In such cross-contamination undesirable orders and flavors can be transferred between foods being cooked in different cavities 20. Accordingly a divider plate 164 may be provided at the end of the chimney 160 separating each of the openings 166 of the exhaust conduits 98 from each other and extending for a diffusion distance of at least 1 inch and desirably at least 2 inches along axes 174 defining the direction of discharge of air from the exhaust conduits 98. In this diffusion distance 170 beyond the upper edge 172 of the chimney 160, flow between exhaust conduits 98 is blocked in favor of diffusion into the outside air. In this respect the divider plate 164 may provide a simple set of divider walls extending radially at equal angles about the center of the chimney 160 to its periphery, the number of walls equal in number to the number of cavities 20 and positioned between each distal end of an exhaust conduit 98.

As used herein the term fan is meant to include all motor driven devices for moving air including blowers fans and the like. Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" or "the microcontroller" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A multi-cavity oven comprising:
a housing providing a cooking volume surrounded by insulated outer walls and at least one door that may open and close to provide access to the cooking volume;
a set of shelves dividing the cooking volume into cooking cavities, the shelves having air channels each leading from an air inlet to upwardly or downwardly directed airstream openings and into adjacent cavities;
at least one fan providing air through the air channels into the air inlets;
a water inlet communicating with a water valve to introduce water into the cooking cavities; and
a controller communicating with the fan and the water valve to provide a first and second cleaning state wherein in the first state, the fan operates below a predetermined airflow rate to allow water from the water inlet to drain backward into and accumulate in the air channels and in a second state the fan operates above the predetermined airflow volume to rapidly expel accumulated water from the air channel through the airstream openings in at least one stream.

2. The multicavity oven of claim 1 wherein the air enters a rear of each shelf opposite the door so that momentum of the water moving through the air channels before discharge through the airstream openings direct at least one stream toward the door.

3. The multicavity oven of claim 1 wherein the door provides a glass panel receiving the at least one stream.

4. The multicavity oven of claim 1 wherein the shelves include a set of airstream openings spaced along two different perpendicular dimensions of the shelves each providing a stream of water.

5. The multicavity oven of claim 1 wherein the controller operates the water valve to allow water to accumulate in the air channels to fill at least 25% of the air channel volume in the first state.

6. The multicavity oven of claim 1 further including a set of drains leading from the cavities and wherein the water valves control the water inlets to provide a greater flow of water into each cavity than a flow of water out of the cavity through the drains to allow accumulation of water in the air channels.

7. The multicavity oven of claim 1 further including a heater operating to heat the water circulating in the cavity through action of the fan.

\* \* \* \* \*